G. W. GOMBER.
INSECT KILLING DEVICE.
APPLICATION FILED MAR. 4, 1915.
1,161,654.
Patented Nov. 23, 1915.
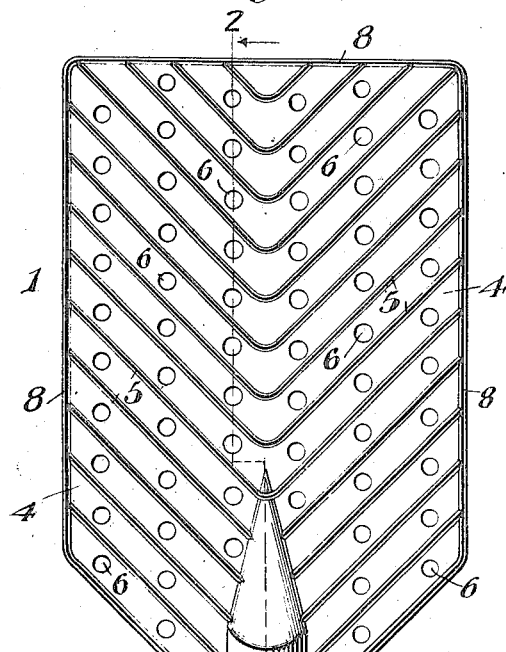
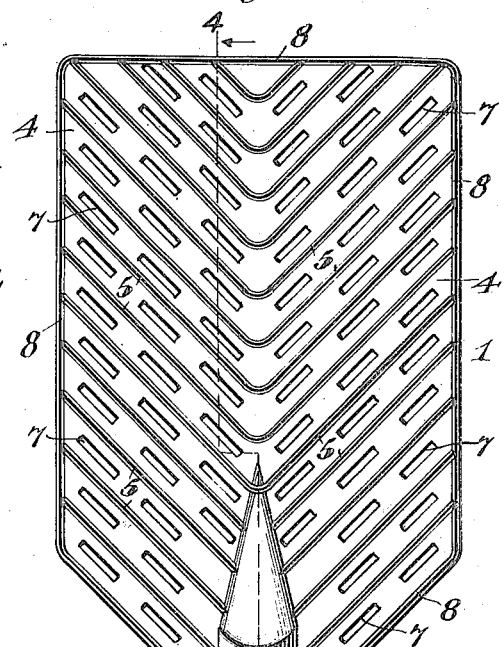
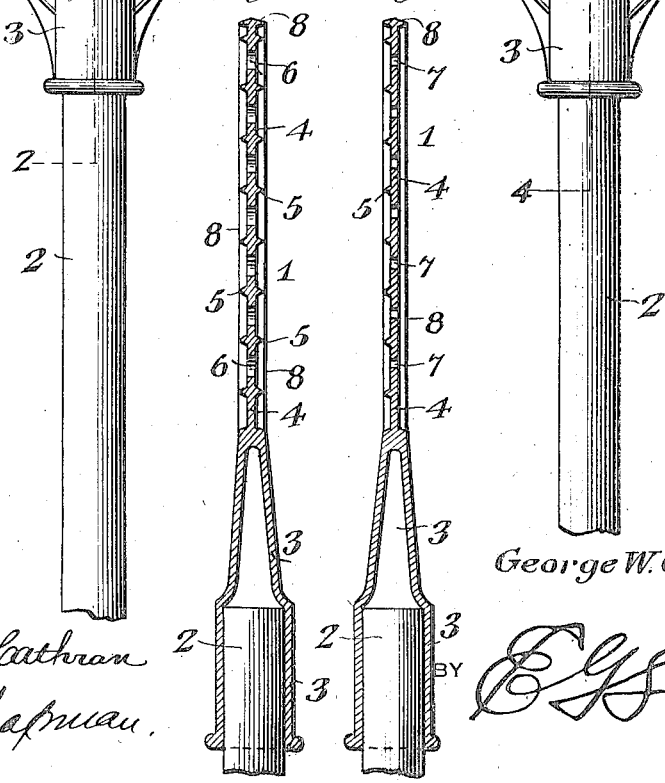
WITNESSES
George W. Gomber,
INVENTOR
ATTORNEY

UNITED STATES PATENT OFFICE.

GEORGE WINFIELD GOMBER, OF CONYNGHAM, PENNSYLVANIA, ASSIGNOR TO STANDARD VENDING MACHINE COMPANY, OF HAZLETON, PENNSYLVANIA.

INSECT-KILLING DEVICE.

1,161,654.

Specification of Letters Patent.   Patented Nov. 23, 1915.

Application filed March 4, 1915. Serial No. 12,044. REISSUED

*To all whom it may concern:*

Be it known that I, GEORGE W. GOMBER, a citizen of the United States, residing at Conyngham, in the county of Luzerne and State of Pennsylvania, have invented a new and useful Insect-Killing Device, of which the following is a specification.

This invention has reference to insect killing devices, and while adapted for the purpose of killing various kinds of insects, is intended more particularly for killing flies, and may, therefore, be termed a fly swatter.

The invention is also designed for the purpose of killing flies without crushing them.

For this purpose the device comprises a sheet or web of suitable flexible material, such as rubber, leather, leatherette, or the like, which web has numerous perforations well distributed over its surface, and in the case of the body member being made of rubber it has molded thereon a marginal rib and numerous surface ribs. By preference the body web is of elongated rectangular form with means for the attachment of a handle at one end and the ribs are so arranged as to form two rows or series of parallel ribs with those of one series in divergent relation to those of the other on opposite sides of the longitudinal center line of the body member and directed toward the outer end of the body member, that is, the end remote from the handle-receiving end. The perforations are disposed in that portion of the body member between the ribs and are provided for the escape of air.

By the employment of soft rubber the whole device is readily molded into shape with the ribs serving as stiffening means, thus permitting the use of a thin web, and by having the ribs of angular cross-section they provide relatively sharp striking edges, and the whole structure may be driven against highly polished furniture or the like, or against other objects without any liability of injury thereto.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is an elevation of a fly swatter constructed in accordance with the present invention. Fig. 2 is a section on the line 2—2 of Fig. 1. Fig. 3 is a view similar to Fig. 1 but showing a modified form. Fig. 4 is a section on the line 4—4 of Fig. 3.

While it is feasible to incorporate certain features of the present invention in a fly swatter made of certain flexible materials, soft rubber presents certain advantages for an implement of the kind to which the invention relates over other materials, and hence in the following description it will be considered that the device is formed of soft rubber molded into the desired shape.

The implement comprises a head 1 and a handle 2, which latter may be made separate from the head and is usually constructed of wood. Since it is often desirable to readily reach flies in corners or angles, the head 1 is made of substantially elongated rectangular shape with a socket 3 at one end for receiving the handle 2. The head 1 comprises a thin web 4 from one or both faces of which project ribs 5 of angular cross-section, that is, they are of substantially V-shape with the apex of the V outward. The ribs are arranged in two series or rows on opposite sides of the longitudinal center line of the head 1 with the ribs of each series parallel to each other and suitably spaced apart in the general direction of the length of the head and with the ribs extended from the longitudinal center line of the head toward the marginal portions thereof at an angle to both, so that the ribs of one series are in divergent relation to the ribs of the other toward the outer end of the body member 1. Of course, the series of ribs may be otherwise related than shown in the drawings.

In Figs. 1 and 2 the ribs 5 on one face of the web 4 coincide with those on the other face thereof, the head 1 being ribbed on both faces. In Figs. 3 and 4 the web 4 is plane on one face and provided with ribs 5 on the other face. In the structure of Figs. 1 and 2 the web 4 between the ribs 5 is multiperforated, the perforations being indicated at 6 as round perforations. In the structure of Figs. 3 and 4 the web 4 is also multiperforated, as indicated at 7, but the perforations instead of being round, as in Figs. 1 and 2, are elongated in the direction of the length of the ribs. These two examples will make it evident that various forms of perforations may be used, so that the invention is not confined to any particular style or type of perforations. In both instances the perforations are through the web 4 between the ribs.

Extending about the margin of the head 1 is a border rib 8 into which the outer ends of the ribs 5 merge. The rib 8 is or may be extended beyond both faces of the web 4, whether or not the ribs 5 are located on both faces thereof. The rib 8 serves as a marginal stiffening means for the web 4 and the ribs 5 serve as surface stiffening means for the web 4 with the result that the web 4 may be quite thin, and much too thin for effective use in the absence of the ribs. Moreover, the ribs provide effective striking means for the insects, whereby the latter are killed without being crushed, while the perforations 6 or 7, as the case may be, provide for the ready escape of air, and this also prevents crushing of the insects. While the ribs 5 and 8 stiffen the web 4, it may still be quite flexible, so that if the head be held horizontally, it will bend to some extent because of its own weight. At the same time it is not too flexible to be ineffective.

By constructing the head 1 of soft rubber it may be readily molded into shape as a one piece structure, is highly sanitary, since it may be readily cleansed at any time, and being of soft yieldable material a forceful blow may be struck with the head 1 upon various objects, including finely polished furniture, and the like, without any injury whatever thereto, nor would the person using the device, or any person struck thereby be injured by the blow. The flexibility and angular shape of the head 1 not only renders the device effective in corners, but along the edges of windows, on curved surfaces, and in other situations.

It is not desired to confine the invention to such a material as soft rubber as the only material from which it may be manufactured, since it is possible to make it of other materials which if not molded into shape may be pressed into a shape conforming more or less to that shown in the drawings.

What is claimed is:—

1. A fly swatter composed of a substantially flat elongated web of flexible material having a handle at one end, and provided on its surface with ribs and having perforations through the thinner portion of the web between the ribs.

2. A fly swatter composed of a substantially flat elongated web of rubber having an open-ended socket to receive a handle, and provided on its surface with ribs and perforations through the thinner portion of the web between the ribs.

3. A fly swatter composed of a substantially flat elongated and substantially rectangular web of flexible material having means at one end for the attachment of a handle and provided with parallel surface ribs diverging from the longitudinal center line of the web toward the end remote from the handle end, said web being also provided with a marginal or border rib.

4. A fly swatter composed of a substantially flat elongated and substantially rectangular web of flexible material having means at one end for the attachment of a handle and provided with parallel surface ribs diverging from the longitudinal center line of the web toward the end remote from the handle end, said web being also provided with a marginal or border rib, and the ribs being formed on and projecting from both faces of the web substantially perpendicular thereto with the ribs on one face coinciding with those on the other face, said web having perforations through the thinner portion between the ribs.

5. A fly swatter comprising a substantially flat elongated and substantially rectangular web of flexible material at one end for attaching a handle thereto and having its face portion provided with parallel ribs diverging oppositely from the longitudinal center line of the web toward the end remote from the handle end and the web between the ribs being perforated, said web being also provided with a marginal or border rib and the ribs on the surface of the web being formed on and projecting from both faces thereof substantially perpendicular thereto with those on one face coinciding with those on the other face and all the ribs being of angular or V shape in cross-section.

6. A fly swatter comprising a substantially flat, thin, elongated and substantially rectangular web of rubber with a handle socket at one end and formed on its opposite faces with series of parallel ribs diverging oppositely from the longitudinal center line of the web toward the end remote from the handle socket, said web being provided with a marginal or border rib and perforated between the ribs, with the diverging ribs of one face coinciding with those on the other face, and all of angular or V-shape in cross-section.

7. A fly swatter comprising a substantially flat, elongated, and substantially rectangular web of rubber provided with a border rib and with surface ribs extending from the longitudinal center line toward the border rib and the web between the ribs being perforated.

In testimony, that I claim the foregoing as my own, I have hereto affixed my signature in the presence of two witnesses.

GEORGE WINFIELD GOMBER.

Witnesses:
EARL CAMPBELL,
WALDRON FREDERICK.